Patented June 24, 1930

1,767,344

UNITED STATES PATENT OFFICE

LOUIS BURGESS, OF JERSEY CITY, AND HYYM E. BUC, OF ROSELLE, NEW JERSEY, ASSIGNORS TO STANDARD OIL DEVELOPMENT COMPANY, A CORPORATION OF DELAWARE

SULPHONIC COMPOUND AND PROCESS OF MAKING THE SAME

No Drawing.    Application filed November 21, 1924.   Serial No. 751,377.

This invention relates to improvements in the preparation of hydrocarbon sulphonic acids and their salts.

Sulphonic compounds are formed when hydrocarbons of certain kinds, for example petroleum oils, are treated with strong sulfuric acid, especially fuming acid, or with sulfuric anhydrid. A part of these compounds, together with any residual sulfuric acid, separates from the oil in the form of sludge. Sulphonic compounds formed in this way are characterized by a high solubility in water, even in the presence of considerable quantities of electrolytes. Owing to the difficulty of separating the sulphonic compounds, they are ordinarily allowed to go to waste. The phrase sulphonating a petroleum oil will be hereinafter employed to denote a sulphonation obtained by treatment with the reagents mentioned.

We have discovered that sludge sulphonic acids may be modified in an advantageous manner by a process which we shall refer to as aging. In carrying out this process, the sludge, as separated from the oil, may be stored at usual atmospheric temperature for several weeks or longer. A moderate aging, such as is produced in this way, or by holding the sludge at temperatures above normal, say up to 120° F., for a somewhat shorter time, produces sulphonic acids that do not show any marked apparent change in physical properties or solubility, yet are much superior to unaged sulphonic compounds as material for stabilizing fire foams.

Aging at higher temperatures, referred to more in detail later, produces a marked change in properties. As aging goes on there is a progressive decrease in solubility of the sulphonic acids in water containing electrolytes. If the aging process is carried sufficiently far there are produced sulphonic compounds practically completely insoluble even in water substantially free from electrolytes.

The physical properties of precipitated sulphonic compounds which have been sufficiently aged are also different from those of such compounds as ordinarily produced. As the aging goes on, the precipitated sulphonic acids tend to become more and more granular and are markedly different from the gelatinous precipitates that are obtained from unaged sludge by usual methods.

When the aging process is to be expedited by keeping the sludge at a temperature somewhat above ordinary atmospheric temperature, we prefer to operate between 90° and 120° F. Higher temperatures than this are not generally advisable when working with untreated sludge, as the effects produced are complicated by reactions due to the strong sulfuric acid that is ordinarily present as a residue. The adverse effects of higher temperatures are avoided by diluting the strongly acid sludge with water so that the concentration of sulfuric acid shall not exceed about 75% $H_2SO_4$. Under these conditions, we have used temperatures as high as 320°–360° F. and have effected very marked changes in a few hours or less, depending upon the amount of water present. Since by operating at high temperatures for short periods the effects of "aging" are produced, we shall use this term as generic to all the methods described herein.

The sulphonic acids may be separated from the aged sludge in a number of ways. For example, since the sulphonic acids may be aged to the extent that they become relatively insoluble in aqueous sulfuric acid, it is possible to separate them from any residual sulfuric acid by appropriate aging, followed by adding water, allowing the mixture to stand, and drawing off the sulfuric acid solution formed. This leaves a sulphonic acid precipitate in substantially pure condition.

Alternatively, the sludge may be treated before neutralization with a salt solution of such strength that the sulphonic acids or their salts are substantially insoluble therein.

The aging process is thus not merely a means of separation, but the properties of the acids and the salts made therefrom are gradually altered, depending on the extent of the aging. For example, the raw or unaged acid is gelatinous and soluble in water even after considerable electrolyte is added, and the same is true for its salts. After aging for several hours the acid appears to take on a more and more granular structure, and both acid and salts become less soluble in water and aqueous solutions of electrolytes such as dilute sulfuric acid.

This same aging may also be carried out at 360° F. If this is done a product insoluble in dilute sulfuric acid is obtained in a few hours, but as mentioned above, the sulfuric acid strength of the mixture being aged must be kept below 75% to prevent charring and other adverse effects.

Products are thus made with properties which vary gradually by changing the time of aging, the temperature and the sulfuric acid strength. Such products are precipitated by dilute sulfuric acid, the dilution of which is specifically dependent on the extent to which the aging process has progressed. For longer times of aging more dilute acids could be used for precipitation, and after several days the product could not even be dissolved in water. We are unable to explain why this happens and content ourselves with noting the facts.

The sulphonic acids contained in the sludges after aging and before or after separation from sulfuric acid may be neutralized with a base of the sodium group to form salts. The salts of the aged sulphonic acids with a base of the sodium group are especially adapted for use in fire-extinguishing compounds. The use of such salts for this purpose is more specifically described in U. S. Patent No. 1,599,006 issued September 7, 1926 to Louis Burgess.

The present invention is not limited to the illustrative methods described. It will be understood that the progressive modification of the sulphonic compounds may be controlled as desired by varying the duration of the treatment, the temperature, the amounts of water and electrolyte present, and other conditions. All such regulation to produce modified sulphonic compounds falls within the scope of the invention as defined in the appended claims.

We claim:

1. Process of modifying a sludge containing sulphonic acids produced by sulphonating a petroleum oil, which comprises holding the sludge at temperatures not exceeding 120° F. for a period of several weeks, and then separating the sulphonic acids.

2. The process according to claim 1 carried out at temperatures between 90° and 120° F.

3. Process of preparing sludge sulphonic compounds, comprising diluting with water a sludge containing sulphonic compounds and uncombined sulfuric acid produced by sulphonating petroleum oil, so that the sulfuric acid strength will not exceed 75% of the total amount of sulfuric acid and water present, subjecting the diluted sludge to a temperature not in substantial excess of 360° F. until the sulphonic acids have been rendered insoluble in the aqueous sulfuric acid and separating the sulphonic compounds.

LOUIS BURGESS.
HYYM E. BUC.